Sept. 8, 1925.
O. A. ANDERSON
GEAR SHIFT LEVER
Original Filed Aug. 8, 1921   2 Sheets-Sheet 1
1,552,409
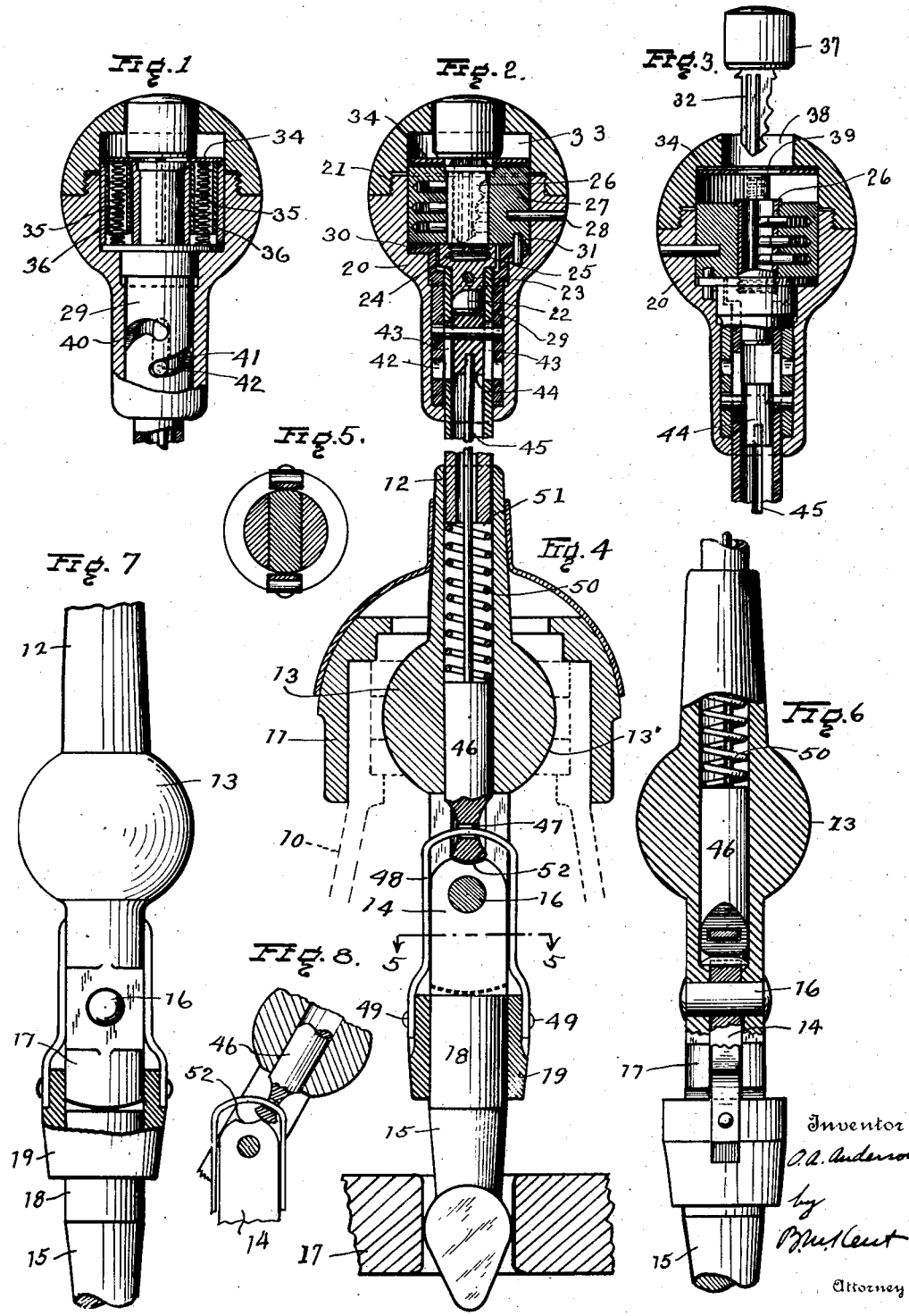

Sept. 8, 1925.   O. A. ANDERSON   1,552,409
GEAR SHIFT LEVER
Original Filed Aug. 8, 1921   2 Sheets-Sheet 2
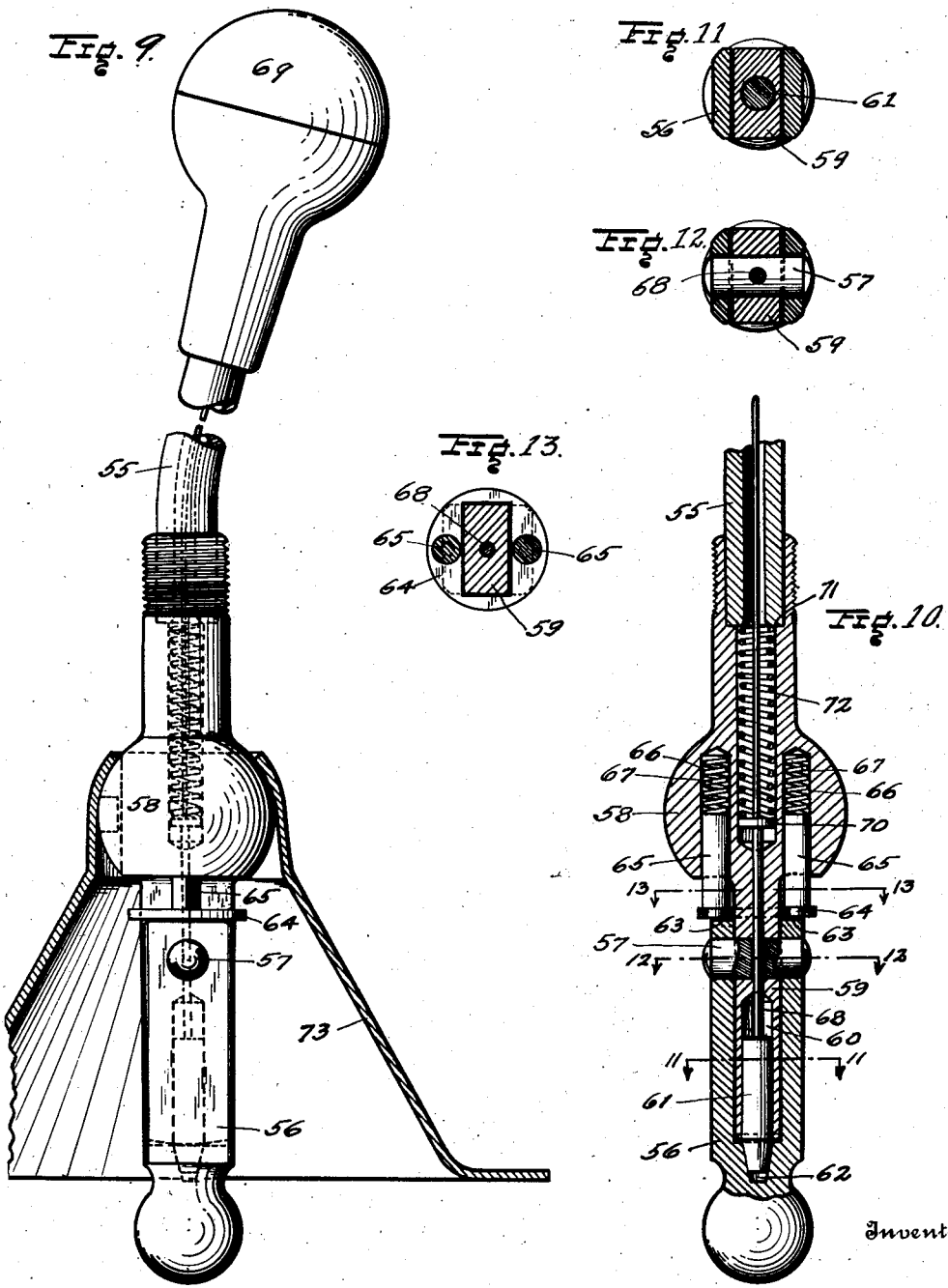

Patented Sept. 8, 1925.

1,552,409

UNITED STATES PATENT OFFICE.

OLAF A. ANDERSON, OF HAMILTON, OHIO.

GEAR-SHIFT LEVER.

Application filed August 8, 1921, Serial No. 490,530. Renewed June 11, 1925.

*To all whom it may concern:*

Be it known that I, OLAF A. ANDERSON, a citizen of the United States, and a resident of Hamilton, county of Butler, State of Ohio, have invented certain new and useful Improvements in Gear-Shift Levers, of which the following is a specification.

This invention relates to gear-shift levers and more particularly to levers embodying a locking device for rendering it inoperative to shift the gears of a motor vehicle.

One of the objects of the invention is to provide a lever of relatively simple construction which can be economically manufactured, which will be interchangeable with non-locking gear-shift levers now in use on motor vehicles, and which will render the vehicle practically thief-proof.

Another object of the invention is to provide a locking gear-shift lever which may be controlled by a key adapted to be inserted in a lock at the top of the lever and which will be entirely housed within the usual knob at the top of the lever when the latter is operative. A further object is to provide a locking device for the purpose specified which will include means for automatically ejecting the key when the lever is locked.

A further object of the invention is to provide a locking gear-shift lever adapted to be locked in any position, i. e., with the gears in neutral or in one of the driving positions.

Other objects of the invention and the features of novelty will be apparent from the description taken in connection with the accompanying drawings, of which:

Figure 1 is a longitudinal section thru the knob at the top of a lever embodying my invention, Fig. 2 is a similar view taken at right angles to Fig. 1, and showing the relation of the parts when the device is unlocked;

Fig. 3 is a view similar to Fig. 2 but showing the parts in the locked position;

Fig. 4 is a longitudinal section of the lower part of a gear-shift lever embodying my invention, the lever being shown in its relation to the transmission gear housing and one of the gear-shifting rods, the parts of the lever being, in this case, shown in their locked relation;

Fig. 5 is a transverse section on the line 5—5 of Fig. 4;

Fig. 6 is a view similar to Fig. 4 but at right angles to the latter;

Fig. 7 is a side elevation of the lever shown in Fig. 4 with certain parts shown in section and the lever in the unlocked condition;

Fig. 8 is a fragment of Fig. 4, on a reduced scale, with the parts shown in a different relation;

Fig. 9 is a side elevation of another form of the invention;

Fig. 10 is a longitudinal section of the same taken at right angles to Fig. 9; and Figs. 11, 12 and 13 are, respectively, sections on the lines 11—11, 12—12 and 13—13 of Fig. 10.

Referring to the drawings, 10 indicates the transmission gear housing and 11 a cap adapted to be positioned over the usual upward extension of the housing in which the gear-shift lever is seated, the cap 11 being preferably pinned to the housing in order to prevent removal of the lever. The lever proper comprises the upper or handle section 12 having a ball 13 adjacent its lower end which is seated in the spherical socket 13' in the housing 10 in the usual manner. The lower end of the section 12 is bifurcated to receive a tongue 14 on the lower section 15 of the lever which is pivotally connected with the upper section by the pivot pin 16 and has its lower end in cooperative relation with the usual gear-shifting member 17. From Fig. 7 it will be observed that the lower end of the lever section 12 is of rectangular cross-section adjacent the pivot pin 16 and is exteriorly of cylindrical form at the extreme lower end as indicated at 17. The lever section 15 has a cylindrical portion 18 preferably of the same diameter as the exterior of the member 17 of the upper lever section, and a sleeve 19 is slidably arranged on the parts 17 and 18. From Figures 4 and 7 it will be apparent that the sleeve 19 is adapted, when in the position shown in Fig. 7, to rigidly connect the lever sections 12 and 15 together so as to prevent relative swinging movement therebetween on the pivot 16, and when the sleeve 19 is in the position shown in Fig. 4 the lever sections are adapted for relative swinging movement so that the upper section 12 may be freely moved back and forth without moving the gear-shifting member 17. When the sleeve 19 is in the position shown in Figure 7 the movement of the upper section 12 of the lever will actuate the member 17 in the usual manner and effect shifting of the gears.

In order to drive a vehicle, that is provided with the usual sliding gear transmission, by its motor, it is necessary to have the transmission gears in proper mesh for moving the vehicle either forward or backward and when the gear-shift lever is in its neutral position no power can be transmitted from the motor to the wheels of the vehicle. It, therefore, follows that if, in the present case, the sleeve 19 is in the position illustrated in Fig. 4, when the lever is in neutral position and the gears are out of mesh, the transmission may be said to be locked because movement of the upper or handle section 12 of the lever will not move the member 17 and will, therefore, not effect the meshing of any of the gears. Likewise if the member 17 has been shifted to bring any particular pair of gears into mesh for driving the vehicle forward or backward and the sleeve 19 is then moved to the position shown in Fig. 4, the transmission may be said to be locked because it is impossible to shift the gears with the handle section 12 of the lever. This arrangement, therefore, enables the locking of the transmission gears either in neutral, in one of the forward speeds or in the reverse position and when in the latter position it will be impracticable to drive the vehicle in any but the backward direction.

It will be noted that the sleeve 19 is located within the housing 10 and, hence, in an inaccessible position. It is, therefore, necessary to provide means for conveniently shifting the sleeve 19 from one of its positions to the other and to be able to lock such shifting means when the sleeve is in the position shown in Fig. 4, in order to have the mechanism fully locked and thief-proof.

For this purpose there is provided at the upper end of the lever section 12 a rotatable knob 20 which is preferably made in two parts having a screw thread connection as indicated at 21. The knob 20 is rotatable on the lever section 12 and the latter, which is of tubular form, has secured in its upper end a plug 22 by means of a pin 23 or otherwise. The plug 22 has rigidly secured to it as by the screw threads 24 and the pin 25, the barrel 26 of a pin lock. The cylinder 27 of this lock is housed in a suitable opening in the knob 20 and preferably secured therein by a pin 28. A sleeve 29 within the knob 20, surrounds the upper end of the lever section 12 and has a flange 30 arranged between the bottom of the cylinder 27 and a shoulder within the knob 20, these parts being secured together against relative rotation by a pin 31. The lock, consisting of the barrel 26 and the cylinder 27, therefore, constitutes a means for securing the knob 20 against rotation. According to the well-known principle of the pin lock, however, when the key 32 is inserted the cylinder 27 may be rotated relatively to the barrel 26 and hence the knob 20 will be unlocked and may be rotated relatively to the lever section 12.

Above the cylinder 27, the knob 20 has a cavity 33 within which a disc 34 is movable longitudinally of the lever. This disc is normally pressed upwardly by springs 35 which are housed in short tubes 36 secured to the underside of the disc 34 as will be cleary seen from Fig. 1. The key 32 has a cylindrical knob 37 and when pressed downwardly thru the opening 38 therefore in the top of the knob the disc 34 will be moved from the position shown in Fig. 3 to that shown in Figures 1 and 2, thereby compressing the springs 35. The disc 34 has an opening 39 thru which the key 32 is inserted and it will be understood that so long as the knob 20 is not turned from the position it occupies in Fig. 1, where the key is inserted, the latter, as soon as released, will be ejected by the disc 34. However, in accordance with the well-known principle of the pin lock, when the knob 20 is turned the key will be locked in the position shown in Figures 1 and 2 and will not again be released until the knob is returned to the original position where the key was inserted. It will also be observed that the knob 37, in Figs. 1 and 2 is housed entirely within the knob 20.

The sleeve 29 is provided with spiral cam slots 40 and 41 with which the ends of a pin 42 cooperate, this pin traversing longitudinal slots 43 in the upper end of the tubular lever member 12, and being carried by a block 44 which is slidable in the member 12 and is rigidly connected with the upper end of a wire or rod 45, which extends downwardly thru the member 12 and has its lower end connected with a plunger 46 in the ball 13. The lower end of the plunger 46 has a perforation 47 thru which a bail or handle 48 extends, the ends of this bail being attached to the sleeve 19 as indicated at the points 49. A spring 50 has its upper end abutting a suitable shoulder 51 in the member 12 and its lower end pressing upon the top of the plunger 46 so that it normally tends to force the plunger downwardly and with it the sleeve 19.

The operation of the device is as follows: When it is desired to unlock the mechanism or, in other words, to rigidly connect the lever sections 12 and 15 together, the key 32 is inserted in the barrel 26 and the knob 20 rotated. This rotation of the knob lifts the plunger 46 against the tension of the spring 50 on account of the ends of the pin 42 travelling in the spiral slots 40 and 41. Fig. 2 illustrates the relation of the parts within the knob after the latter has been rotated and when the sleeve 19 is in the position illustrated in Fig. 7. The lever is now in position to shift the gears and the key will be retained in the knob while the vehicle is being driven. When it is desired to lock the mechanism the knob will be rotated from the position illustrated in Fig. 2 back to the position illustrated in Fig. 3 and when it reaches the latter position the key will be automatically ejected. In thus rotating the knob the sleeve 19 will be lowered to the position illustrated in Fig. 4 and the lever section 12 may be freely moved relatively to the section 15 and without actuating the member 17.

It is desirable to have the lever sections 12 and 15 maintained in their normal relation, even when the mechanism is locked so that when it is desired to unlock the mechanism it will not be necessary to shift the lever section 12 to bring them into alignment and for this purpose I have provided a groove 52 in the upper end of the tongue 14. The lower end of the plunger 46 is rounded to fit into the groove 52 as clearly shown in Fig. 4 so that the pressure of the spring 50 normally tends to hold the lever sections 12 and 15 in alignment. If, however, when the mechanism is locked, the section 12 is shifted the plunger 46 will leave the groove 52 as illustrated in Fig. 8 and when the parts are restored to a position of alignment the snapping of the plunger 46 back into the groove 52 will indicate to the operator that the lever sections are again in condition of alignment.

Referring to Figs. 9 to 13, it will be noted that the lever comprises the handle section 55 and gear shifting section 56 which are pivoted together at 57. Below the ball 58 the section 55 has a flat extension 59 which is arranged in the bifurcated upper end of the section 56. The extension 59 has a longitudinal bore 60 in its lower end in which a plunger 61 slides to and from engagement with a socket 62 in the section 56, as clearly shown in Fig. 10. When the plunger 61 is in the position shown in Fig. 10 the sections 55 and 56 are locked together and move as a unit but when the plunger 61 is lifted out of the socket 62 the section 55 will be free to swing with reference to the section 56, the parts pivoting about the pin 57.

It will be observed that the upper ends 63 of the sides of the section 56 are substantially flat and engage with a collar 64 thru which the extension 59 projects so as to be slidable thereon. The collar 64 carries two plungers 65 which enter pockets 66 in the ball 58. Springs 67 press upon the upper ends of the plungers 65 and force the collar 64 against the ends 63 so as to yieldingly hold the lever sections 55 and 56 in alignment even though the plunger 61 is out of the socket 62. On account of this arrangement the handle section 55 may be freely moved without shifting the gears, when the plunger 61 is out of the socket 62, but when the handle section 55 is released the lever sections tend to automatically align themselves.

A wire or rod 68 is connected with the upper end of the plunger 61 and extends upwardly thru the handle section to a slidable block such as the block 44 shown in Fig. 2 so that the plunger 61 may be raised and lowered by rotating the knob 69, as previously described. A collar 70 is arranged on the rod 68 and between this collar and the shoulder 71, in the handle section 55 is a spring 72, the function of which is to force the plunger 61 into the socket 62.

At 73 I have indicated a portion of the transmission gearing housing but have omitted other parts associated with the lever mechanism as they form no part of the present invention.

While I have illustrated and described what I now consider to be the preferred form of my invention it is understood that various changes may be made in the details of construction without departing from the spirit of the invention as defined in the appended claims.

Having thus described my invention what I claim is:

1. In a device of the class described, the combination of a lever comprising two sections hinged together, a sleeve slidable on one of said sections into engagement with the other section to prevent relative movement between the sections, and means movable longitudinally within one of said sections and operatively connected with said sleeve to actuate same.

2. In a device of the class described, the combination of a lever comprising two sections hinged together, a sleeve slidable on one of said sections into engagement with the other section to prevent relative movement between the sections, and means movable longitudinally within said other sections and operatively connected with said sleeve to actuate same.

3. In a device of the class described, the combination of a lever comprising two sections hinged together, a sleeve, slidable on one of said sections into engagement with the other sections to prevent relative movement between the sections, means movable longitudinally within one of said sections and operatively connected with said sleeve to actuate same, and a rotatable knob for actuating said means.

4. In a device of the class described, the combination of a lever comprising two sections hinged together, a sleeve slidable on one of said sections into engagement with the other section to prevent relative movement between the sections, means movable longitudinally within said other section and operatively connected with said sleeve to actuate same, and a rotatable knob on said other section for actuating said means.

5. In a device of the class described, the combination of a lever comprising two sections hinged together, a sleeve slidable on one of said sections into engagement with the other sections to prevent relative movement between the sections, means movable longitudinally within one of said sections and operatively connected with said sleeve to actuate same, a rotatable knob for actuating said means, and a lock for securing said knob against rotation.

6. In a device of the class described, the combination of a lever comprising two sections hinged together, a sleeve slidable on one of said sections into engagement with the other section to prevent relative movement between the sections, means movable longitudinally within said other section and operatively connected with said sleeve to actuate same, a rotatable knob on said other section for actuating said means, and lock for securing said knob against rotation.

7. In a device of the class described, the combination of a lever comprising a handle section, having a spherical portion by which it is mounted for swinging movement, and a gear-shifting section having a hinge connection with said handle section at a point spaced from the point about which the handle section swings, a member movable longitudinally of one of said sections and adapted to rigidly connect said sections together for unitary movement, a member movable longitudinally within said handle section to actuate the first-mentioned member, and lock-controlled means for actuating the second-mentioned member.

8. In a device of the class described, the combination of a lever comprising a handle section mounted for swinging movement and a gear-shifting section pivotally connected with said handle section, a member movable longitudinally of one of said sections and adapted to rigidly connect said sections together for unitary movement, a member movable longitudinally within said handle section to actuate the first-mentioned member, and a rotatable lock-controlled knob on said handle section for actuating the second-mentioned member.

9. In a device of the class described, the combination of a lever comprising a handle section mounted for swinging movement and a gear-shifting section pivotally connected with said handle section, a sleeve slidable longitudinally on said gear-shifting section and adapted to rigidly connect said sections together for unitary movement, means movable within said handle section to actuate said sleeve, and a lock-controlled knob on said handle section for actuating said means.

10. In mechanism of the class described, the combination of a housing, a lever mounted thereon to project partly within the housing and comprising a handle section having pivoted thereto within said housing a gear-shifting section, movable means carried by said lever within said housing adapted to rigidly connect said sections together for unitary movement, means within said handle section for actuating the first-mentioned means, and a lock-controlled knob movable on said handle section for actuating the second-mentioned means.

11. In mechanism of the class described, the combination of a housing, a lever mounted thereon to project partly within the housing and comprising a handle section having pivoted thereto within said housing a gear-shifting section, movable means carried by said lever within said housing adapted to rigidly connect said sections together for unitary movement, means movable longitudinally within said handle section for actuating the first-mentioned means, and a lock-controlled rotatable knob on said handle section for actuating the second-mentioned means.

12. In mechanism of the class described, the combination of a housing, a lever mounted thereon to project partly within the housing and comprising a handle section having pivoted thereto within said housing a gear-shifting section, movable means carried by said lever within said housing adapted to rigidly connect said sections together for unitary movement, means within said handle section for actuating the first-mentioned means, a lock-controlled knob movable on said handle section for actuating the second-mentioned means, and means for yieldingly retaining said lever sections in their normal relation when said first-mentioned means is inoperative.

13. In mechanism of the class described, the combination of a housing, a lever mounted thereon to project partly within the housing and comprising a handle section having pivoted thereto within said housing a gear-shifting section, movable means carried by said lever within said housing adapted to rigidly connect said sections together for unitary movement, means within said handle section for actuating the first-mentioned means, a lock-controlled knob movable on said handle section for actuating the second-mentioned means, and cooperating means on said second means and said gear-shifting section for yieldingly retaining said lever sections in their normal relation when said first-mentioned means is inoperative.

14. In a device of the class described, the combination of a lever comprising two sections one of which has a bifurcated end and the other of which has an extension arranged in said bifurcated end and pivoted thereto, a member carried by one of said sections and movable to and from a position to radially connect said sections together, one of said sections having a spherical portion whereby the lever may be mounted for universal movement, and spring pressed means in said spherical portion co-operating with said bifurcated end to retain said sections in their normal relation when said member is in position to permit relative movement on said pivotal connection.

15. In a device of the class described, the combination of a lever comprising a handle section mounted for swinging movement, a gear shifting section having a bifurcated end which is pivoted to said handle section, a member slidable in said handle section and adapted to be projected from the end thereof into engagement with said gear shifting section to lock said sections together, a rotatable knob at the upper end of said handle section, and means operatively connecting said knob with said member to move the latter into and out of engagement with said gear shifting section.

In testimony whereof I affix my signature.

OLAF A. ANDERSON.